Patented Sept. 24, 1946

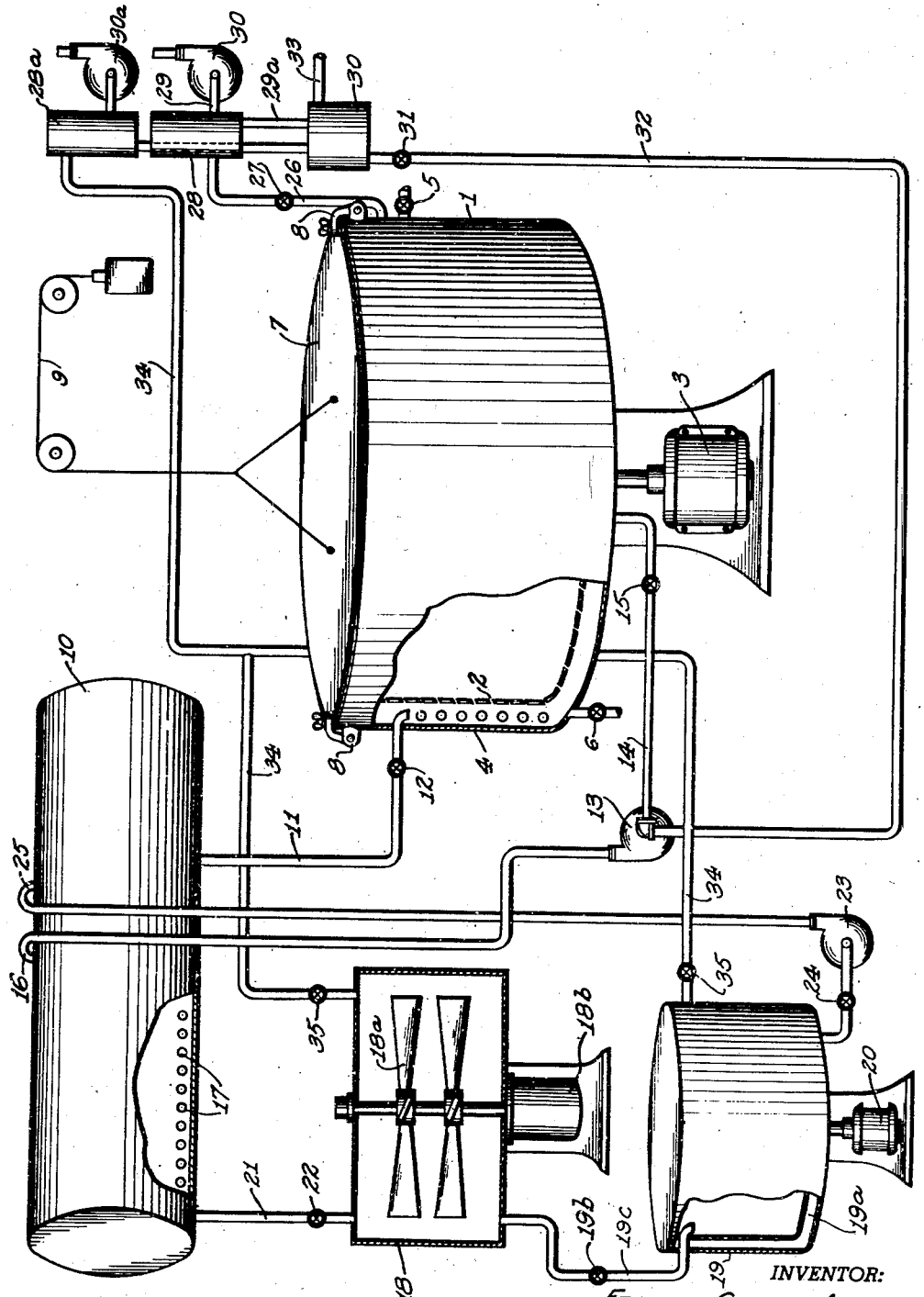

UNITED STATES PATENT OFFICE 2,408,026

PROCESS FOR TREATING SYNTHETICALLY SHAPED PROTEIN BASE MATERIALS

Francis Clarke Atwood, Newton, Mass., assignor, by mesne assignments, to National Dairy Products Corporation, New York, N. Y., a corporation of Delaware Application January 23, 1942, Serial No. 427,940

4 Claims. (Cl. 8—127.6)

This invention relates to the formation of synthetically shaped protein base containing materials.

The invention includes, more particularly, the formation of synthetic materials made from an alkali-soluble acid-coagulable protein as a base material, such as an animal and vegetable casein; such animal casein is typified by the casein obtained from milk, and the vegetable casein is typified by the protein obtained from soybean, castor bean and similar sources of the alkali-soluble acid-coagulable proteins.

The invention may be applied to the manufacture of synthetic protein base materials in a variety of forms such as film, fiber, and products that are cast, extruded or molded into other shapes. For simplicity, however, the invention will be described primarily with reference to the formation of fiber made artificially from animal or vegetable casein as a base, more particularly, the casein derived from milk. Such a fiber has been referred to variously as synthetic wool, synthetic silk and synthetic fur. Since the fiber has unique properties not identical with any of the above, I have suggested that it be referred to by the generic term "prolon," or simply as synthetic protein or protein base fiber.

While the process by which my new fiber is made utilizes a protein as the base material, the final fiber is not of the same chemical constitution, nor does it have the same chemical or physical properties, as the protein. The finished fiber probably cannot be termed a protein in the strict sense of this word, and for this reason I have used the expression "protein base" to distinguish the material of my fiber from fiber that is a true protein.

Protein-containing materials have many desirable properties that render them valuable for many uses, such as covering and decorative materials and upholstery, including woven fabrics and felts, and for the use in articles of clothing including clothes, shoes, gloves and hats. These properties include warmth, softness, flexibility, tensile strength, elasticity and other similar properties possessed by protein-containing materials. These properties may be viewed in general as physical properties and will be so referred to herein.

The proteins are composed essentially of carbon, hydrogen, oxygen and nitrogen and may contain small amounts of sulfur or phosphorus or both. They vary somewhat in their chemical reactivity depending upon their exact chemical constitution, both from the standpoint of their empirical composition as well as their structural composition. Ordinary synthetic casein fiber, for example, is affected adversely by hot water, alkaline or soap solutions and dilute acid solutions such as are encountered in dyeing. Over long periods of time such fiber also tends to deteriorate so as to become brittle or lose its strength and softness. Such fiber also reacts in an undesirable way with many chemical agents such as dyes. These various properties of proteins may be considered generally as chemical properties, i. e., the ability of the protein to combine physically or react chemically, or resist such combination with oxygen, water, acids, alkalies and other chemicals such as dyes.

While the physical properties of fiber prepared from the proteins such as casein, including the common method of soaking the shaped casein fiber in formaldehyde solutions are satisfactory for some purposes, they are far from satisfactory for most uses to which fibers are to be put. With respect to their chemical properties particularly they leave much to be desired. For example, a fiber prepared from a casein dispersion and coagulated, in which process it is hardened by the usual treatment with formaldehyde, is not resistant to hot water or dilute acids or alkalies. Particularly is this so if the water solution contains an alkaline material such as would be present in a hot solution of an ordinary soap. Upon the heating or boiling of such fiber in such a solution it becomes soft and spongy and takes on a "slimy feel." The tensile strength of the fiber and its elasticity in such a state is also greatly reduced so that the fiber is readily deformed or broken. Upon drying such fiber after it has been subjected to such treatment, it becomes brittle so that further handling results in excessive "droppings," if in fact the fiber is sufficiently flexible to be subjected to any further processing. Ordinary casein fiber, in addition, does not have dyeing properties enabling it to be dyed in a manner similar to naturally occurring proteinaceous fiber. The ordinary casein fiber also is subject to a change in properties due to contact with moisture in the air. In humid air it is relatively plastic, but in dry air it is quite brittle.

From the above it will be seen that the synthetic protein fiber as known heretofore in the art, such as that shaped from casein and hardened with formaldehyde, is entirely different from natural proteinaceous fiber such as wool, silk or fur, and is not suited for the uses to which such natural fibers may be put. This difference is so marked as not to be simply a matter of degree. Apparently the casein inherently is of such a nature as not to possess satisfactory properties for fiber purposes. Attempts at modifications of the casein have not produced a fiber which has satisfied the textile industries.

I have discovered that an entirely new fiber may be made, utilizing protein as the principal base material, but which nevertheless possesses desirable chemical properties and is not subject to the influences that affect ordinary casein fiber, and at the same time has physical properties that are improved or at least not inferior to the known synthetic protein fibers. I believe that the chemical composition of the fiber is entirely different from that of the protein used as the base material and that this difference is largely responsible for the desirable properties of the fiber.

In accordance with my invention a fiber may be produced that is relatively resistant to chemical activity of the undesired type, such as breakdown by bleaching agents and deterioration by hot water, acids or alkalies, while at the same time it has desirable chemical properties imparted to it with respect to its reaction to dyestuffs and chemicals ordinarily used in the processing of naturally occurring proteinaceous fibers. In accordance with the invention, the fiber also remains soft and pliable and retains or even has its tensile strength and other physical properties improved. It acquires properties normally desired by textile operators as to its moisture content, or the moisture content of the air with which it is in contact.

The process of my invention produces a new fiber that can withstand boiling for long periods of time in water, as well as in hot dilute acid solutions such as are used in dyeing. It is also enabled to withstand vigorous mechanical treatment combined with alkaline material, such as "fulling" and "scouring" operations, even after preparing it for dyeing operations.

The new synthetic protein base fiber produced in accordance with my invention, not only is resistant to dyeing operations, but has desirable properties in that it accepts dyes ordinarily accepted by natural proteinaceous fiber and rejects dyes which are not accepted by natural protein fiber. Since one of the more important uses of the synthetic protein base fiber is in admixture with natural protein fiber, it is desirable that the two should have similar dyeing properties. Not only does the fiber behave similarly toward the same dyes, but it accepts the dye at substantially the same rate so that at the end of the dyeing operation of a mixture of natural and synthetic protein base fiber, all of the fiber will be of substantially the same shade.

It will be recalled that upon the development of the rayon industry it was necessary to perfect new dyes and new dyeing techniques because of the different chemical constitution and different physical properties of the rayon fiber. Such an approach might similarly have been made with respect to the synthetic protein fiber. I prefer, however, not to do this. Rather than develop new dyes and new dyeing technique for the known synthetic protein fiber I prefer to make a new fiber that may be treated by the methods and dyes that are standard in the protein fiber industries, such as the woolen industry, the silk industry or the fur felt industry, for example, the hat industry.

In accordance with my invention, therefore, I produce a fiber having dyeing properties similar to those of natural protein fiber, both with respect to its behavior to different dyes and its dyeing rates.

A more detailed description of the chemical composition of the fiber and its properties is set forth hereinafter following the description of the process by which it is made.

The fiber produced in accordance with my invention may be regarded broadly as the reaction product of an alkali-soluble acid-coagulable protein, formaldehyde, and an acylating anhydride. This new chemical compound or composition can be made and then given the shape of fiber, or the protein ingredient can be shaped and the reaction of the protein and formaldehyde and anhydride can be carried out while the protein is in the shaped form. It is the latter procedure that I prefer because this makes it possible to delineate or orient the protein molecule and then form the new compound using the delineated protein as the base material.

In particular, I have discovered that if synthetic protein fiber is treated with a formaldehyde solution and then acylated with an acid anhydride under certain conditions hereinafter set forth, the fiber is relatively resistant to water, and acid and alkaline solutions; its chemical reactivity with respect to chemical substances, such as dyes, is such that it may be dyed by processes substantially identical with those heretofore used for dyeing natural protein fibers, such as wool, silk and fur; and it has the other desirable physical and chemical properties set forth herein.

More particularly, I have discovered that in the above process the anhydride should be in admixture with a definite proportion of a free acid, which may or may not be the same acid as that corresponding to the anhydride, said anhydride and acid being in an inert solvent and said treatment being under definite controlled conditions as to temperature, concentration of anhydride, time of treatment, and concentration of acid.

In accordance with my invention it is also possible to carry out the process in such form that the critical relation between the acid and the anhydride may be kept substantially constant throughout repeated treatments of additional quantities of the protein material.

Still further in accordance with my invention it is possible to carry out the process under such conditions as to recover substantially all of the solvent, anhydride and acid, with the exception of the anhydride which has reacted during the treatment of the material.

The synthetic protein fiber that is to be reacted with formaldehyde and the anhydride in accordance with my invention may be made by any known processes in which the protein is dissolved or dispersed with an alkaline material, such as caustic, or in an organic alkaline material such as amines. Softening or modifying agents may be added, but are not essential. The protein dispersion is then extruded through the small holes of a spinnerette and coagulated in fiber form by means of an acid. The fiber is then treated with formaldehyde, washed and dried. So much of my process is known to the art and the exact details by which the fiber is produced up to this stage of the process are not critical in so far as my invention is concerned, except as above indicated.

A protein fiber that has been given a thorough treatment with formaldehyde, such as by soaking it for a long time in a formaldehyde solution, apparently does not have the formaldehyde permanently combined with it. Such fiber upon treatment with water or aqueous solutions, readily yields at least a portion of its formaldehyde, either because it is held only in a more or less physical relationship, such as adsorption or absorption, or if chemically combined easily yields it through hydrolysis. At any event, the formaldehyde is not combined with such permanence as will permit the fibers to retain their hardened state upon prolonged aqueous treatment. This is confirmed by statements in Sutermeister and Browne which states that when casein is treated with a formaldehyde solution for 16 days the resulting formaldehyde-casein product was insoluble in water and was not swelled when treated with dilute acids. However, when the formaldehyde-casein product was suspended in water and subjected to steam distillation, practically all of the so-called "bound" formaldehyde was found in the distillate. The remaining product showed in certain tests the properties of unaltered casein.

This is further evidenced by the fact that the literature contains references to methods for testing casein fiber (to distinguish it from wool) by determining the amount of formaldehyde in such fiber. (Klepzig's Textile-Z. 41, 463-6 (1938) and Helv. Chim. Acta 24, 237-42 (1941).) Such tests show that the formaldehyde is present in ordinary casein fiber in such a way that it can be separated or released so as to be determined quantitatively.

Not only is the formaldehyde readily liberated, but upon boiling such prior art fiber with water or weak acid the fiber goes to a gelatinous-like mass losing its fiber identity and drying to a hard, brittle substance. Also such prior art fiber loses a substantial portion of its weight during the boiling test used in the formaldehyde determination.

In contrast with the above, and in accordance with my process, formaldehyde introduced into the fiber is combined during the anhydride treatment in some new way such as to produce a new fiber having different properties.

That formaldehyde is combined with the protein in my new fiber in a different and new chemical way is indicated by the fact that the fiber is vastly more stable against various chemical deteriorations including hydrolysis, thereby showing that at least a part of the formaldehyde is not merely absorbed or held by the protein in some loose chemical way, but rather that it enters into a reaction in the acylating process to produce a new molecule which is a chemical combination of the several reacting ingredients. This is further demonstrated by the fact that my new fiber is different than the product obtained when a fiber is acylated which has not had a previous formaldehyde treatment.

The difference between my new fiber and prior fiber is further indicated by the fact that my new fiber, upon boiling with water or a weak acid, retains its fiber identity and substantially all of its physical characteristics after the boiling operation. In addition, its loss of weight is not more than about 2 to 4%, thereby indicating that any changes in the fiber during boiling are relatively insignificant insofar as they affect its properties and utility as fiber.

I stated previously that the fiber should be treated with formaldehyde so as to have the formaldehyde absorbed or loosely combined with the protein at the time of the treatment with the anhydride. The fiber may be treated with formaldehyde in any conventional manner as by immersing it in a formaldehyde solution or treating it with formaldehyde vapor.

In my application Serial No. 417,024, filed October 29, 1941, I have described a method of treating protein fiber with formaldehyde, in which the pH and temperature are controlled whereby a maximum amount of the formaldehyde is combined with the protein in a minimum of time. This process may be employed, although the standard procedure of soaking the fiber in the ordinary formaldehyde solutions for a long time, for example, 12 hours, may also be used.

The amount of formaldehyde so absorbed or loosely combined should be at least 2% and preferably 3 or 4%, based on the dry fiber before treatment.

The amount of formaldehyde absorbed or loosely combined may be determined by any suitable technique. I have found it convenient to take a sample of wet fiber of a given weight with known moisture and solids content and treat it with formaldehyde solution of a known concentration for the given desired time period, or until equilibrium is reached under the treating conditions. The fiber is then removed and the concentration of the formaldehyde solutions after treatment again determined. Since some water is given off by the fiber because of its initial moist condition and possibly also because of the reaction with the formaldehyde, it is necessary to determine the moisture content of the fiber before and after the formaldehyde treatment. From the amount of formaldehyde in the solution of initial concentration, and from the amount of formaldehyde in the solution after treatment, (taking into account the moisture in the fiber before and after treatment) the amount of formaldehyde removed from the solution (and absorbed by the fiber) can be determined and the percentage on the dry weight of the fiber can similarly be calculated.

The amount of formaldehyde in the solutions is determined by the standard sulfite method for analyzing for formaldehyde.

In accordance with my invention, the formaldehyde treated fiber is subjected to treatment with an acid anhydride in admixture with free acid, the acid and the anhydride being present within a fixed ratio of amounts. Any anhydride exerting an acylating action may be used, such as the anhydride of a carboxylic acid. The anhydride may be of an acid that is the same as the free acid used in the process or it may be different. For example, the anhydrides of acetic acid, such as acetic anhydride or ketene may be used with acetic acid, or acetic anhydride or ketene may be used with other acids, such as formic, maleic, malic, stearic, lactic, butyric or phthalic acids. Anhydrides of acids other than acetic acid may be used, such as phthalic anhydride, propionic anhydride, lactic anhydride, maleic anhydride, butyric anhydride, stearic anhydride, adipic anhydride, succinic anhydride, cinnamic anhydride, lauric anhydride, benzoic anhydride, or mixtures thereof, with the corresponding acid or with other acids.

While any of the above materials may be used in accordance with my invention, I will describe an illustrative embodiment utilizing acetic anhydride and acetic acid, since these are relatively inexpensive materials and are readily available in the open market in adequate quantities for practicing the invention on a commercial scale.

Reference may also be had to the attached sheet of drawings which illustrates an apparatus which may be used in practicing the invention.

Referring more particularly to the drawing, a centrifuge is indicated generally at 1, preferably of relatively large dimensions. The centrifuge is provided with a perforated basket 2 mounted for rotation by suitable motor 3. The centrifuge is provided with coils 4 through which steam or any heating or cooling medium may be introduced by means of a valve 5, and withdrawn by an exit valve 6. The centrifuge is provided with a cover 7 which may be secured to the centrifuge by means of suitable clamps 8, which may be spaced around the centrifuge so as to hold the cover tightly. Gaskets or washers to provide a tight seal may be used in the conventional manner. Since the cover is relatively heavy in such a large centrifuge, a suitable lifting or counterbalancing means 9 is provided for raising and lowering the cover.

A supply tank 10 is provided of such dimensions as to hold the treating liquid in an amount at least sufficient to fill the centrifuge. This tank may be elevated above the centrifuge so that the liquid may be withdrawn therefrom by gravity through a pipe 11 and introduced into the centrifuge by means of a valve 12. A pump 13 is provided by means of which the liquid may be removed from the centrifuge through a pipe 14 by way of a valve 15. The pump returns the liquid through the pipe 16 into the supply tank. If desired the tank may be below the centrifuge and the liquid pumped from the tank to the centrifuge and returned by gravity.

The supply tank is provided with heating coils 17 through which steam or other heating medium may be passed to heat the liquid in the supply tank to the desired temperature.

In order to modify the constitution of the treating liquid in the supply tank for the purpose to be mentioned hereinafter, a treating chamber 18 is provided. This may be equipped with agitating paddles 18a driven by a motor 18b. When the liquid is to be modified, it may be withdrawn from the supply tank through a pipe 21 by way of a valve 22 and introduced into the chamber 18. Following the treatment the liquid may be discharged into a centrifuge 19 by way of a pipe 19c and a valve 19b. This centrifuge has a basket 19a rotatable by a motor 20. Following centrifuging the liquid may be pumped back into the supply tank by means of a pump 23 by way of a valve 24 and a return pipe 25.

Connected with the treating centrifuge 1 is a conduit 26, leading through a valve 27, to a condenser 28. A vacuum pump 30 is connected with the condenser through a pipe 29. By this arrangement it is possible to place the treating centrifuge under vacuum when it is desired. Connected with the condenser 28, through a conduit 29a, is a receiver 30 in which the condensate may be collected. The treating liquid may be separated from any water by stratification and withdrawn through a valve 31 and returned through a pipe 32, through the pump 13, and to the supply tank by way of the pipe 16. Any water separated from the solvent can be removed from the overflow pipe 33.

The treating chamber 18 and centrifuge 19 are also connected to a condenser 28a and an exhausting pump 30a by means of conduits 34 connected through valves 35. By this means it is also possible to exhaust vapors from the chamber 18 and centrifuge 19 and condense them. The above apparatus is illustrative and other examples of apparatus will occur to persons skilled in the art.

When it is desired to treat the fiber, a quantity is placed within the centrifuge basket 2 and the cover 7 is tightly secured thereto by means of the clamps 8. Valves 15 and 27 are closed and treating liquid admitted from the supply tank 10 by means of the valve 12 until the fiber is covered with the liquid. The fiber is then allowed to stand in contact with this liquid for the required length of time and if desired the centrifuge may be operated very slowly so as to obtain uniform admixture of the liquid through the fiber during the treating operation. Also since the reaction forming the new fiber is exothermic, the circulation of the liquid through the fiber prevents local overheating. In order that the temperature of the liquid may be kept at the desired point or raised during the treatment, steam or other heating medium may be introduced through the pipes 4. Ordinarily the operation is carried out at atmospheric pressure within the centrifuge, but it will be apparent that the structure utilized permits superatmospheric pressure, if this is desired.

Following the treating operation, the valve 15 is opened and the treating liquid drains from the fiber and is returned to the supply tank by means of the pump 13. After all of the liquid that will drain from the fibers has been pumped from the centrifuge, the centrifuge is operated at high speed for a few minutes. The centrifugal force removes a large portion of the liquid. This liquid drains into the bottom of the centrifuge and is removed therefrom and returned to the supply tank by the pump 13.

The size of the centrifuge is not critical, but it is preferred to use one holding from 200 to 500 pounds of fiber at a time. A centrifuge having a rotatable basket five feet in diameter is suitable for this purpose. During a centrifuging operation, this may develop a centrifugal force of about 200 g., which is effective for separating most of the treating fluid from the fiber.

After all of the liquid has been removed from the fiber, the valve 15 is closed, and the valve 27 is then opened. A vacuum is applied to the centrifuge to create an absolute pressure as low as is feasible with apparatus of this type. A vacuum of 25 to 29 inches is desirable, and one as low as 28 inches is preferred. At this low pressure the liquid is quite volatile and the latent heat in the fiber, together with any additional heat which may be supplied, is sufficient to vaporize substantially all of the liquid which has not been removed from the fiber during centrifuging. The liquid is condensed in a condenser 28 and after separation from any water in the receiver 30 is returned to the supply tank by way of the conduit 32 and the pump 13.

If the sensible heat in the fiber, and that which may be introduced by means of the coils 4, is not sufficient to vaporize the remaining liquid at the vacuum employed, it is possible to admit a suitable amount of very hot air into the centrifuge; this facilitates vaporization of the treating fluid.

However, due to the poor heat conductivity of the fiber and the difficulty in introducing heat except by a circulating liquid, I prefer to remove so much of the liquid by centrifugal forces as to leave no more of the liquid on the fiber than can be evaporated by the latent heat in the fiber at the reduced pressure employed.

After this operation the vacuum valve 27 is closed and the cover removed from the centrifuge. The treated fiber is then removed, washed and treated by any subsequent processing operation desired.

The liquid used in the treatment contains the anhydride and the acid in required proportions. Preferably these are contained in an inert solvent which acts as a diluent.

The solvent should be selected because of its inertness with respect to the anhydride, the acid and the protein being treated, as well as its solvent action on the anhydride, at the temperatures employed. The boiling point of the solvent preferably is above the temperature at which the treating operation is carried out so as not to require superatmospheric pressure during the treatment, but the boiling point also should not be too high above the treating temperature so as not to prevent evaporation of the liquid when the vacuum is applied subsequent to the treating operation. In general, it is preferable that the boiling point of the solvent should be above that of water, so as to facilitate separation of water in vapor form from the solvent. If, for example, the liquid is to be heated to a temperature of about 190° F. at the time of treatment, the solvent should have a boiling point of at least 200° F., and preferably above 220° F. Solvents that have been found suitable include hydrocarbons having the desired boiling point and the halogenated hydrocarbons. For reasons of convenience and safety non-inflammable solvents, such as halogenated hydrocarbons, are preferred. A particularly suitable solvent is perchloroethylene or tetrachloroethylene. This has a boiling point of about 248° F. and permits the treating operation to be carried on at around 185 to 210° F., as may be desired.

The temperature of the liquid at the time it is introduced to the fiber and while in contact therewith will depend upon the concentration of the anhydride and the length of the time it is desired to subject the fiber to the treatment. I have discovered that quite high temperatures may be used without harming the fiber. If for a given concentration of the anhydride, a treatment for one-half hour at 190° to 200° F. is satisfactory, the time could be reduced to one-half that, namely, to fifteen minutes if the temperature is raised to 220° F. However, at temperatures much above 200° F. there may be some slight yellowing of the fiber. This may be unobjectionable when the fiber is to be used for some purposes, but if a white fiber is desired the highest temperature to be used is selected with this consideration in mind. The temperature may be reduced below 190° F. by continuing the treatment for a longer period. Treating for the lengths of time given does not harm the fiber, but for economic reasons it will be understood that there is no advantage in continuing the treatment beyond such time as is necessary to secure the desired results.

The temperature could be reduced still further by employing a higher concentration of the anhydride in the diluent solvent. For example, if the solvent contained about 50% anhydride a lower temperature of approximately 150° F. could be used and the time of treatment reduced to a very few minutes. The use of larger quantities of anhydride, however, is not as economic as the use of a smaller quantity at a higher temperature, nor is the control as accurate.

In the above discussion the amounts given are by weight using perchloroethylene as the diluent. If a lighter diluent is used suitable adjustment must be made.

From the above it will be seen that the rate of the reaction is dependent upon temperature and concentration of anhydride. Since the reaction is exothermic the rate must not be so high as to produce local overheating. The rate is adjusted so that the heat developed by the reaction can be absorbed by the liquid and thus the fiber prevented from yellowing by subjection to too high a temperature.

The relation of the treating temperature, the concentration of anhydride, and the length of treatment also involve economic factors, including the cost of heat, the amount of fiber that must be treated per day in a given amount of equipment, and the price of anhydride. Within the figures set forth above, and in view of the principles announced herein, anyone skilled in the art will be enabled to relate these factors taking into account the economics involved and the type of property desired. In general, I prefer to use a treating temperature between 180 and 200° F., a solvent having a boiling point of between 200 and 250° F., a concentration of anhydride from 3 to 10%, desirably at least 5% and preferably 7 to 8% by volume, and a treating time of 20 minutes to one hour or 90 minutes.

Preferably the liquid is introduced at a lower temperature, say 185° to 190° F. so that as the reaction begins there will be no local overheating. As it proceeds and nears the end the temperature may be raised to 200° F. without harm. The higher temperature also provides a larger amount of latent heat in the fiber to remove the solvent by vaporization when the vacuum is applied.

The amount of treating liquid of any of the compositions described above that is required in relation to the amount of fiber to be treated may vary over relatively wide ranges. Since all of the treating liquid is recovered except the anhydride which enters into chemical combination during the treatment, it is preferred to use enough to thoroughly cover the fiber during the treatment. In general, 7 or 8 to 40 parts of the liquid to 1 part of the fiber is preferred. The fiber gains in weight by about 3 to 8% following the treatment, which is attributed to the anhydride that combines chemically with it. Thus the amount of anhydride present during the treatment is adequate for the purpose.

Inclusion of the proper amount of acid with the anhydride is essential. The exact chemical role the acid plays is not entirely clear, since the acid itself is not capable of acylating the fiber. However, I have discovered that anhydrous fiber treatd with acid free anhydrous anhydride is not acylated satisfactorily. The ratio of the acid to anhydride is preferably about 10 parts of anhydride to 1 to 10 parts of acid, preferably 3 to 5 parts of acid by weight or volume since the densities of the acid and anhydride are so similar. Thus, a preferred treating liquid might contain 8 parts of anhydride, 2.5 parts of acid and 89.5 parts of a solvent, by weight.

It is preferred that the fiber should be as free from water as possible at the time of treatment, since any water contained in the fiber reacts with the anhydride to form acetic acid and undesirably increases the ratio of acid to anhydride in the treating liquid and uses up a portion of the anhydride. However, it may be uneconomic under some circumstances to dry the fiber to a completely anhydrous state before treatment, and the dry appearing fiber may usually contain up to 10% moisture. Furthermore it may be difficult to dry the formaldehyde treated fiber to a moisture content below 1½% without harming it. The extent to which the fiber is dried will depend upon the economics involved. Thus, it may be more expensive to reduce the moisture in the fiber below a given amount than it is to utilize a part of the anhydride by reaction with the water. Under present circumstances it is desirable to reduce the moisture to not over 2%.

In view of this circumstance the ratio of acid to anhydride in the treating liquid before it is introduced into the treating centrifuge should be adjusted in view of the moisture content of the fiber. Thus, if the fiber contains moisture the amount of anhydride in the liquid should be increased and the amount of acid decreased below the preferred ratio, so that upon introduction of the liquid into the centrifuge and reaction of anhydride with the moisture in the fiber, the amounts of anhydride and acid remaining in the liquid will be those preferred. This, of course, involves simple chemical calculations.

After each treatment of moisture containing fiber the anhydride and acid content of the treating liquid is altered. It is necessary, therefore, to correct the composition of the liquid in the supply tank before the next batch of fiber is treated.

Since a portion of anhydride is used up in each treatment both by combination with the fiber and by reaction with any water in the fiber, it is necessary to add anhydride to the supply tank, preferably after the treatment of each batch, so that the anhydride concentration will be correct.

Since the amount of acid in the treating liquid will constantly increase upon reusing it if the fiber contains moisture, it is necessary to remove a portion of the acid, preferably after the treatment of each batch of fiber. This is done most readily by neutralizing the acid and removing it as a salt.

Rather than treat all of the liquid so as to reduce the amount of acid to the desired point, I find it convenient to completely neutralize all of the acid in a portion of the liquid, the amount of liquid so neutralized being such that upon its return to the entire volume of liquid the acid ratio will be correct. This is accomplished readily as follows:

After the liquid has been returned from the centrifuge 1 by the pump 13 to the supply tank 10, a sample is withdrawn and analyzed for anhydride and acid content. Sufficient anhydride is then added to raise the anhydride concentration to the desired amount. From simple calculations it is possible to determine what fraction of the total volume of liquid can have all of the acid removed therefrom so that the entire volume of liquid will have the desired amount of acid. After this calculation is made, the calculated amount of liquid is withdrawn through the pipe 21 by opening the valve 22 and admitting the calculated amount of liquid into the treating chamber 18. To this is added soda ash or a caustic which neutralizes the acid. Preferably the temperature at the time of neutralization is 200° F. or above and the liquid may be heated water formed upon neutralization is readily removed in the treating chamber by steam coils. The water formed upon neutralization is readily removed by means of the vacuum pump 30a so that it is not available to decompose the anhydride in the liquid. When soda ash is used to neutralize the acid, the water is vaporized and goes off with the carbon dioxide. The liquid is then admitted to the centrifuge 19 by the pipe 19c and valve 19b. The basket within the centrifuge is preferably lined with canvas or a filtering material. The salt formed by the neutralization is retained within the basket and by rotating the basket of the centrifuge, it is possible to eliminate substantially all of the liquid from the salt. At the same time the acid-free liquid is pumped from the centrifuge by means of the pump 23 and returned to the supply tank by means of the pipe 25. After all of the liquid has been returned to the supply tank, the vacuum line 34 may be closed and the acetate removed from the centrifuge basket. The acetate may be reconverted into acetic anhydride by known chemical methods, so that there is no loss because of moisture in the fiber.

The various materials condensed in the condenser 28, including water, acid, anhydride and diluent solvent, are passed to the receiver 30. These materials stratify into an upper layer of water and a lower layer of diluent. Apparently both the anhydride and the acid are more soluble in the solvent than in water and the lower strata, which contains the diluent solvent, anhydride and acid may be pumped back into the supply tank.

From the above description it will be apparent that my process appears to be applicable most readily to a batch operation, but it may also be applied to a continuous process. For example, the fiber in continuous strands or ropes may be drawn through pipes or tubes through which the treating liquid is flowing preferably countercurrently.

The fiber, at the time it is introduced into the centrifuge, may be in a tow of continuous filaments, or it may be cut into staple form. In the latter form the staples will be free to take on or relax into any position and thus can acquire a crimp which will be permanent, since the new chemical compound will be formed while the fiber is delineated in the crimped position.

I have described my invention primarily with reference to treatment by acetic anhydride and acetic acid. As I have mentioned previously, the anhydrides of other acids and other free acids may be used. The anhydride may be of the same acid that is present in free form or of a different acid. Generally when a different combination of acid and anhydride is employed, it is preferable to utilize acetic or lactic acid as the acid since these acids are desirable because of their swelling action on the fiber and the consequent increase in speed of reaction. The combination, for example, of acetic acid with malic or maleic anhydride products a very soft fiber similar to camel's hair. Lactic anhydride and lactic acid give admirable results. A mixture of acetic acid and stearic anhydride or any other high molecular weight anhydride produces an unusually soft fiber. The lubricating properties of the high molecular weight fatty acid can be readily noticed in the finished fiber, but it has the advantage that the high molecular weight softening fatty material is combined chemically with the fiber. In some instances the anhydride may be formed at the time of the treatment. For example, acetic anhydride and stearic acid will form stearic anhydride and acetic acid and the action may be the combined acylating actions of stearic and acetic anhydrides.

I have indicated heretofore that the protein, formaldehyde and anhydride combine to form a new chemical compound. The exact reactions are difficult to describe because of the complex nature of protein, particularly casein. My investigation led me to believe that the reaction of the formaldehyde and the anhydride with the protein is one involving the amino groups of the protein. Benedicenti has suggested that the reaction between casein and formaldehyde is somewhat as follows:

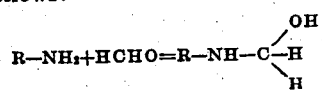

where R is the casein residue. The fact that the formaldehyde can apparently be removed readily from the formaldehyde-casein complex seems to be suggestive that the reaction is of the above type.

Upon treatment of the casein-formaldehyde complex with the acylating agent it is probable that a reaction of the following nature takes place: R—NH—CH$_2$—OOCR$_1$, where R$_1$ is the residue of the acylating anhydride, i. e., CH$_3$ in the case of acetic anhydride.

The exact chemistry involved must at best be a matter of speculation, since the complexity of the matter does not permit a definite determination.

That the reaction is one in which the formaldehyde combines with the amino groups and the anhydride then combines with this combination is indicated by the fact that the carboxyl groups probably remain unaltered in the protein molecule. My new fiber has an acid number as does casein which indicates that there are probably some unaltered carboxyl groups. However, the carboxyl groups apparently do not contribute to any undesirable properties of the fiber.

That my new product is the reaction of protein, formaldehyde and the anhydride is shown by the fact that the treatment of casein fiber with an anhydride, which fiber has not previously has a formaldehyde treatment, does not produce my new fiber. Apparently in such a treatment the anhydride combines with groups in the protein to form linkages which are hydrolyzable.

As further indicative of the fact that the amino groups are blocked, my new fiber is not amphoteric as are ordinary proteins in that it does not possess an isoelectric point characteristic of protein.

That the fiber produced in accordance with my invention is entirely different is indicated by the fact that it will withstand vigorous boiling for two hours in neutral distilled water without any substantial deleterious effect, and upon removal from this boiling water treatment and drying by usual methods the fiber will retain substantially all of its original qualities which render it suitable as a fiber. It will be appreciated that this is a very vigorous test and that there are even few naturally occurring proteinaceous fibers which will withstand such a test.

Fiber produced in accordance with my invention will also pass the so-called "pepsin test" (Melliand Textilber. 20, 697-8 (1939)). This is one of the most rigorous tests to which this type of proteinaceous fiber can be subjected and that my fiber is not attacked by the pepsin in this test indicates that it is no longer a pure protein material.

As further indicative of the novelty of my invention I might mention that the treatment of casein fibers as proposed heretofore in the art, such as by treatment with nitrous acid or a treatment with halides, does not result in a fiber which will withstand the above described "boil test" or "pepsin test."

The fiber after being removed from the centrifuge at the end of the treatment may be washed to remove free acid, since it is more or less permeated by the free acid in the treating liquid. The water dissolves a substantial proportion of the acid. However, it is impossible as a practical matter to dissolve all of the acid and the fiber is left with a resulting pH value characteristic of the free acid used, irrespective of the amount of acid retained, even though this be extremely small. In the case of acetic acid this will be a pH of 3.5 to 4. This is very desirable, since a fiber having this pH is particularly desired in the manufacture of felt hats from the fiber.

In the event that the pH value of the fiber is to be raised, this can be done by treating the fiber with a buffered neutralizing agent, such as disodium hydrogen phosphate and washing to remove the phosphate, and any other salts formed. By adjusting the concentration of the neutralizing solution and the time of treatment, the resulting fiber may be given any pH value desired. A pH value of 5 to 6 is desired by the textile trade, and a low free acid, preferably less than 1.0%.

At any stage of the treating operations the fiber may be treated with a softening agent, preferably a cationic active compound such as "Ahcovel" which does not have any effect upon the pH value of the fiber.

My invention can be the subject of many variations as is indicated herein, and can use many equivalent materials all of which are to be included as indicated in the following claims.

This application is a continuation-in-part of my applications Serial No. 242,279, filed November 25, 1938; Serial No. 291,616, led August 23, 1939, and Serial No. 309,028, filed December 13, 1939.

I claim:

1. A method of improving the dyeing properties of a synthetic protein-base material formed by shaping an alkali-soluble acid-coagulable protein comprising casein and treating it with formaldehyde, which comprises subjecting said protein-base material to a treating liquid at a temperature above 150° F., said treating liquid comprising an inert diluent in which is dissolved from 3 to 50% of the anhydride of a carboxylic acid in admixture with 1 to 10 parts of a free carboxylic acid for each 10 parts of the anhydride.

2. A method of improving the dyeing properties of a synthetic casein-base fiber formed by shaping said casein into fiber form and treating it with formaldehyde, which comprises subjecting said fiber to a treating liquid at a temperature above 150° F., said treating liquid comprising an inert diluent in which is dissolved from 3 to 50% of an anhydride of acetic acid in admixture with 1 to 10 parts of acetic acid for each 10 parts of the anhydride.

3. A method of improving the dyeing properties of a synthetic casein-base fiber formed by shaping said casein into fiber form and treating it with formaldehyde, which comprises subjecting said fiber to a treating liquid at a temperature of 150° to 220° F. for from 15 to 90 minutes, said treating liquid comprising an inert diluent in which is dissolved 3 to 10% of acetic anhydride and 1 to 10 parts of acetic acid for each 10 parts of the anhydride.

4. A method of improving the dyeing properties of a synthetic casein-base fiber formed by shaping said casein into fiber form and treating it with formaldehyde, which comprises subjecting said fiber to a treating liquid for from 15 to 90 minutes at a temperature of from 150° to 220° F., said treating liquid comprising a volatile inert diluent containing at least 5% and less than 50% acetic anhydride and 1 to 10 parts of acetic acid for each 10 parts of acetic anhydride, then centrifuging the fiber after the treatment to remove the major portion of the treating liquid adhering to the fiber, and evaporating still an additional amount of the remaining adhering treating liquid by placing the fiber under a vacuum.

FRANCIS CLARKE ATWOOD.

Certificate of Correction

Patent No. 2,408,026. September 24, 1946.

FRANCIS CLARKE ATWOOD

It is hereby certified that errors appear in the printed specification of the above numbered patent requiring correction as follows: Column 10, line 9, after "temperature" insert *of*; column 11, line 56, strike out the words and syllable "water formed upon neutralization is readily re-"; column 12, line 45, for "products" read *produces*; column 13, line 30, for "has" read *had*; and that the said Letters Patent should be read with these corrections therein that the same may conform to the record of the case in the Patent Office.

Signed and sealed this 26th day of November, A. D. 1946.

[SEAL]

LESLIE FRAZER,
*First Assistant Commissioner of Patents.*